(12) United States Patent
Simon et al.

(10) Patent No.: US 8,464,852 B2
(45) Date of Patent: Jun. 18, 2013

(54) WET CLUTCH

(75) Inventors: Yannick Simon, Lauterbourg (FR);
Christoph Raber, Ottweiler-Steinbach (DE); Christoph Wittmann, Buehl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/457,103

(22) Filed: Apr. 26, 2012

(65) Prior Publication Data

US 2012/0241275 A1 Sep. 27, 2012

Related U.S. Application Data

(63) Continuation of application No. PCT/DE2010/001227, filed on Oct. 18, 2010.

(30) Foreign Application Priority Data

Oct. 29, 2009 (DE) .......................... 10 2009 051 243
Dec. 21, 2009 (DE) .......................... 10 2009 059 738

(51) Int. Cl.
*F16D 21/08* (2006.01)
*F16D 13/04* (2006.01)
*F16D 13/54* (2006.01)

(52) U.S. Cl.
USPC ...... 192/35; 192/54.52; 192/70.23; 192/93 A; 192/99 A

(58) Field of Classification Search
USPC ....................................................... 192/54.52
See application file for complete search history.

(56) References Cited

U.S. PATENT DOCUMENTS

| 4,645,049 | A | 2/1987 | Matsuda et al. |
| 2003/0094343 | A1* | 5/2003 | Showalter ........................ 192/35 |
| 2005/0167229 | A1 | 8/2005 | Tsukada et al. |

FOREIGN PATENT DOCUMENTS

| EP | 0728958 | 8/1996 |
| EP | 1780432 | 5/2007 |
| GB | 2251465 | 7/1992 |
| JP | 2005344920 | 12/2005 |

* cited by examiner

*Primary Examiner* — Rodney Bonck
(74) *Attorney, Agent, or Firm* — Simpson & Simpson, PLLC

(57) ABSTRACT

A wet clutch including a main clutch, a clutch basket, which is actively connected to a crankshaft, forming an intake part and having a plurality of discs mounted therein so as to be rotatably fixed and axially displaceable, a clutch hub which is connected to a transmission input shaft, forming an output part and having counter-discs that are layered in an alternating manner with the plurality of discs, where the counter-discs are mounted so as to be rotatably fixed and axially displaceable, and a pilot clutch, actuated by means of a lever element, where the pilot clutch is upstream from the main clutch and the pilot clutch and the main clutch are connected to each other by means of a ramp device which is provided, in the circumferential direction, with ramps that are active at least in the direction of traction of the internal combustion engine.

11 Claims, 10 Drawing Sheets

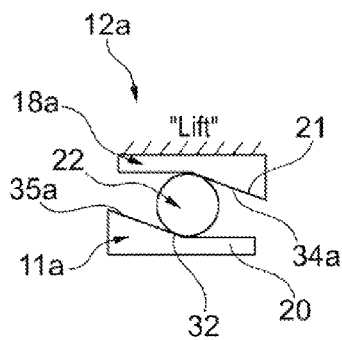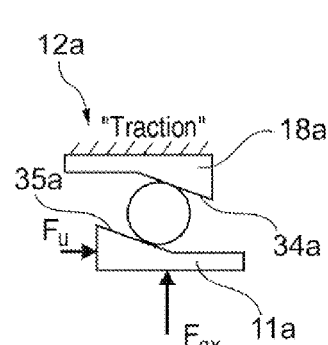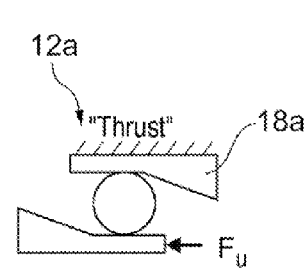
Fig. 18a    Fig. 18b    Fig. 18c
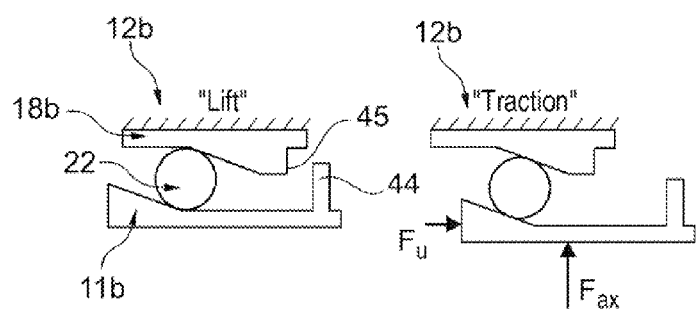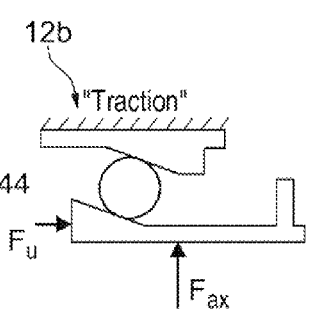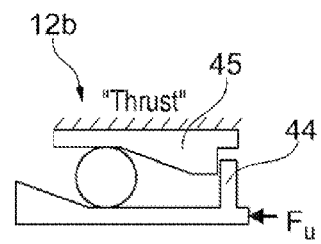
Fig. 19    Fig. 19a    Fig. 19b
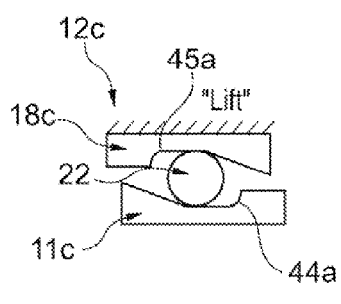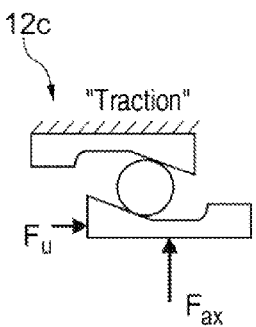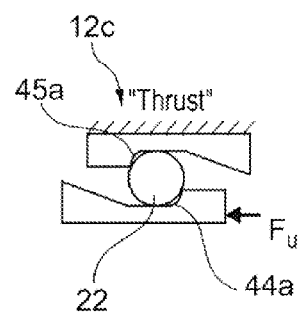
Fig. 20    Fig. 20a    Fig. 20b

WET CLUTCH

CROSS-REFERENCE TO RELATED APPLICATIONS

This application is filed under 35 U.S.C. §120 and §365(c) as a continuation of International Patent Application No. PCT/DE2010/001227 filed Oct. 18, 2010 which application claims priority from German Patent Application No. 10 2009 051 243.8 filed Oct. 29, 2009 and German Patent Application No. 10 2009 059 738.7 filed Dec. 21, 2009, which applications are incorporated herein by reference in their entireties.

FIELD OF THE INVENTION

The invention relates to a wet clutch, which is arranged between a crankshaft of an internal combustion engine and a transmission input shaft of a transmission in a drivetrain, preferably for a motorcycle, having a main clutch comprising a clutch basket which is actively connected to the crankshaft, forms an input part and has discs mounted therein so as to be rotatably fixed and axially displaceable to a limited extent, and a clutch hub which is connected to the transmission input shaft forming an output part and having counter-discs that are layered in an alternating manner with the discs and are mounted so as to be rotatably fixed and axially displaceable to a limited extent.

BACKGROUND OF THE INVENTION

Generic wet clutches, for example in motorcycles, are known from European Patent No. 1 780 432 A1. In a clutch basket that serves as an input part of the wet clutch and is actively connected to the crankshaft, discs are alternatingly layered axially with counter-discs that are non-rotatably connected to a clutch hub actively connected to the transmission input shaft of a transmission and serving as an output part of the wet clutch, and are axially clamped by a lever element such as a disc spring. The activation force for the wet clutch results from the required initial tension of the lever element in relation to the discs and counter-discs to transmit the torque provided by the internal combustion engine. As the nominal torque of the internal combustion engine increases, the necessary activation force also increases along with the disengagement path of the clutch lever given a corresponding transmission ratio. The work required to open the wet clutch remains the same.

Furthermore, such drivetrains with powerful internal combustion engines in motorcycles tend to cause the rear wheel to hop when downshifting suddenly since it cannot sufficiently withstand the increasing thrust torque from the internal combustion engine, and the adhesion to the road is interrupted. To prevent this hopping, there is a long-felt need for a temporary decoupling of the internal combustion engine for the transmission by means of a ramp device.

BRIEF SUMMARY OF THE INVENTION

One object of the invention is therefore to reduce the work to be performed when actuating a wet clutch by, for example, reducing the actuation force over the same disengagement path. Furthermore, such a wet clutch contains a device for avoiding hopping (anti-hopping system).

Another object of the invention is to provide a wet clutch, which is arranged between a crankshaft of an internal combustion engine and a transmission input shaft of a transmission in a drivetrain, for example for a motorcycle, including a main clutch having a clutch basket, which is actively connected to the crankshaft, forming an input part and has discs mounted therein so as to be rotatably fixed and axially displaceable to a limited extent, and a clutch hub, which is connected to the transmission input shaft, forming an output part and having counter discs that are layered in an alternating manner with the discs and are mounted so as to be rotatably fixed and axially displaceable to a limited extent, where the main clutch is upstream from a pilot clutch actuated by means of a lever element, and the pilot clutch and main clutch are connected to each other by means of a ramp device provided in the circumferential direction with ramps that are active at least in the direction of traction of the internal combustion engine.

Such a wet clutch represents a so-called booster clutch where only the slight actuation force for the smaller pilot clutch is applied and, depending on its state of actuation, the main clutch is actuated by the torque applied by the internal combustion engine. The pilot clutch can be designed as a wet clutch having a clutch basket and a clutch hub as well as discs and counter-discs alternately layered between them, or as a dry friction clutch including a pressure plate contacted by the lever element and opposite a counter pressure plate with intermediate friction linings of a clutch disc. The pilot clutch can, for example, be designed for a transmissible torque between 40 Nm and 100 Nm. The main clutch can, for example, be designed for a transmissible torque of 100 Nm to above 200 Nm, where the main clutch can transmit the multiple torque of the transmissible torque of the pilot clutch. The actuation force of the wet clutch is accordingly reduced to the actuation force of the pilot clutch, such that, for example, a wet clutch having a transmissible torque of 250 Nm has the actuation force of a wet clutch with 80 Nm.

When the pilot clutch is engaged, it transmits the applied torque from the internal combustion engine to the ramp device so that its ramp rings axially clamp the discs and counter-discs of the main clutch in relation to each other with ramps ascending in the circumferential direction, and thereby engaging the main clutch. The ramp device with its ramp rings having ramps arranged complementary to each other acts like a screw device that screws the main clutch tight when the pilot clutch is engaged. If the pilot clutch is disengaged when the lever element is actuated, the ramp device is relaxed, and the main clutch is also disengaged. The ramp device can be formed by means of two ramp rings mounted on each other with ramps arranged complementary to each other. In one embodiment, the ramp rings can have ramps that are recessed complementary to each other and rise in both circumferential directions (direction of thrust and traction) proceeding from a home position, and have balls that roll in their running tracks. When there is a shift from traction to thrust mode and vice versa, the ramp rings twist relative to each other with a zero passage in which the main clutch is briefly disengaged. As a result of the initial tension of the discs and counter-discs and the inner friction of the ramp device, the main clutch can be opened at a delay by the ramp device so that thrust torque is already transmitted when the ramp device is at zero passage. To prevent this, the ramp device can be pre-tensioned in a circumferential direction to compensate for such friction torque.

To design a device for preventing the rear wheel from hopping, the ramps acting in the thrust direction can be designed with flatter slopes or without a slope so that no torque builds in the main clutch in the thrust direction, and if applicable, the pilot clutch can transmit reduced thrust torque while the main clutch is disengaged. If the thrust torque exceeds the maximum transmission capacity of the pilot clutch, it slips, and can therefore be adjusted to limit torque. A freewheel can also be provided in thrust mode between the bearing of the pilot clutch on the main clutch that is disengaged in the direction of traction and locked in the direction of thrust. In the traction direction, the engaged pilot clutch twists the ramp device and thereby engages the main clutch. In the thrust direction, the main clutch does not transmit any torque due to the lack of a ramp slope. The freewheel between the pilot clutch and main clutch locks in the thrust direction such that the pilot clutch engages between the input part such as the clutch basket, and the output parts such as the clutch hub of the main clutch, and transmits thrust torque up to its maximum transmission torque to the internal combustion engine and then slips. A delayed effect therefore arises from the drag torque of the internal combustion engine, however, the hopping of the rear wheel is prevented.

In one embodiment, the pilot clutch is rotatably arranged on the clutch hub, where the pilot clutch and the main clutch are connected to each other by means of the ramp device. The input parts can form a single-part clutch basket. Alternatively, both clutches can form separate clutch baskets actively coupled to each other in a circumferential direction by means of an energy storage mechanism such as a compression spring.

In another embodiment, the pilot clutch can be designed as a wet clutch with a separate clutch basket connected to the clutch basket of the main clutch by means of an energy storage mechanism that acts in a circumferential direction in an alternative to a single-part embodiment of the clutch basket for both clutches.

In yet another embodiment, the pilot clutch can be rotatably arranged on the clutch hub, where the pilot clutch and the main clutch are connected to each other by means of the ramp device. In addition to a single-part connection, the pilot clutch can, if applicable, be designed as a wet clutch having a separate clutch hub connected to the clutch hub of the main clutch by means of an energy storage mechanism acting in a circumferential direction.

The lever element for actuating the pilot clutch that can be a disc spring with disc spring tongues, which are axially displaced radially to the inside, for example, pulled or pushed via a clutch release bearing by an actuating device activated by a Bowden cable or hydrostatically, clamps the pilot clutch to form an axial friction lock. The lever element can axially abut an axially fixed component such as its own clutch basket or clutch hub, or the clutch hub or clutch basket of the main clutch. An input disc that is axially displaceable to a limited extent is pre-tensioned by the lever element against an output disc that is axially displaceable to a limited extent and acts on, or forms, the ramp ring assigned to the pilot clutch. The input disc assigned to the main clutch is pre-tensioned or formed by the ramp ring assigned to the main clutch. The output disc of the main clutch is axially fixed to its clutch hub or clutch basket. In one embodiment, the lever element can be axially pre-tensioned between the input disc of the pilot clutch and the output disc of the main clutch.

In one embodiment, a device for preventing hopping can also be designed completely without the formation of thrust torque. Ramps are provided that act in the direction of traction, and no ramps are provided in the direction of thrust. In addition, there is no stop limit of the ramp device, thus, allowing the clutch hub to rotate unrestrictedly in reference to the clutch basket in thrust mode. A ramp device is, for example, proposed in this regard in which balls are, for example, arranged fixed and radially displaceable by a ball cage at a predetermined angle in the circumferential direction and roll in an annular groove introduced into each of the ramp rings. Ramps running in a circumferential direction that are distributed across the perimeter branch radially outward from the annular groove corresponding to the angular distribution and number of the balls, and the balls are displaced there under the influence of centrifugal force. The ramps arranged complementarily in both ramp rings contact and engage the main clutch under traction. Under thrust, the balls fall back into the annular groove as the centrifugal force decreases and completely disengages the rotary lock of the wet clutch.

Alternately, the balls can be accommodated in a ramp ring and experience a load in the direction of thrust in opposition to the effect of an energy storage mechanism acting in the circumferential direction, and form a sliding contact with a complementarily arranged annular part that preferably does not have any ramps.

BRIEF DESCRIPTION OF THE DRAWINGS

The nature and mode of operation of the present invention will now be more fully described in the following detailed description of the invention taken with the accompanying drawing figures, in which:

FIGS. 18a through 20b show different operating states of ramp devices that have been changed in comparison to FIGS. 6, 6a, and 6b;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
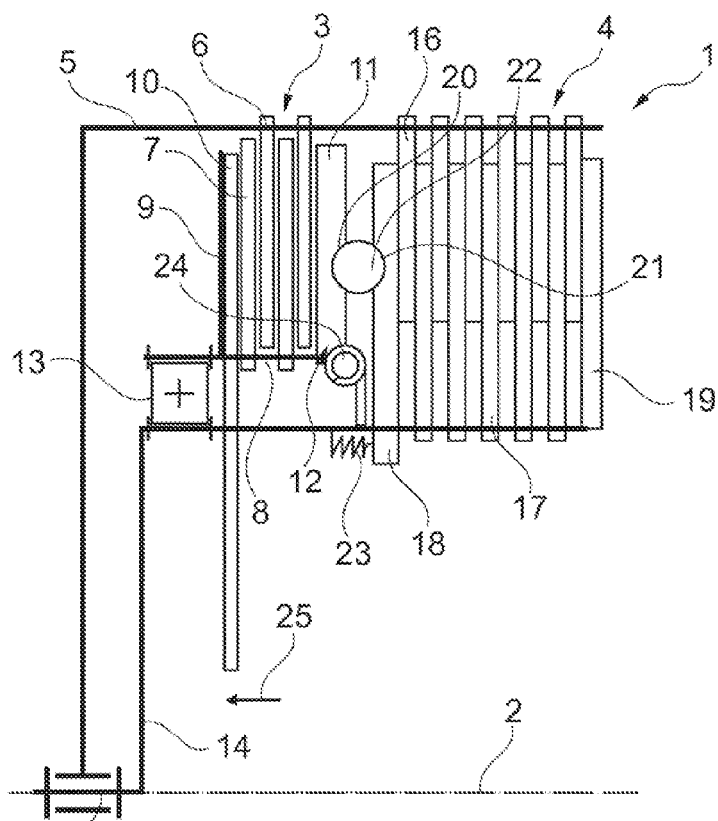
FIG. 1 shows a partial section of a schematically portrayed wet clutch.

FIG. 1 shows a schematic representation of a partial section of wet clutch 1 arranged about rotary axis 2 including pilot clutch 3 and main clutch 4. Pilot clutch 3 includes discs 6 that are non-rotatably suspended and axially displaceable to a limited extent in clutch basket 5 connected at the drive side, for example, to the crankshaft, and that can be formed from catch or friction discs, and that are alternately layered with these counter-discs 7 that, for example, can be made of steel. Counter-discs 7 are non-rotatably and displaceably seated on clutch hub 8 of pilot clutch 3.

On one axial end, clutch hub 8 forms stop 9 for lever element 10, and at the other end, accommodates ramp ring 11 to form ramp device 12. Clutch hub 8 of pilot clutch 3 is rotatably mounted and axially fixed on clutch hub 14 of main clutch 4 by means of ball bearing 13. Clutch hub 14 is firmly connected to transmission input shaft 15, and clutch basket 5 is rotatably mounted thereupon.

Discs 16 and counter-discs 17 of main clutch 4 are designed corresponding to discs 6 and counter-discs 7 of pilot clutch 3, and are non-rotatably accommodated in alternating layers on clutch basket 5 or clutch hub 14 in an axially displaceable manner. The disc package that these form is arranged in an axially tensionable manner between ramp ring 18 arranged at the input side and output disc 19 firmly connected to clutch hub 14 at the output side.

Ramp device 12 is formed by ramp rings 11, 18, and by balls 22 rolling between them in ramps 20, 21 aligned in a circumferential direction provided in ramp rings 11, 18 with complementary slopes. Ramp ring 18 is axially clamped against ramp ring 11 by means of tension spring 23 suspended on clutch hub 14.

When wet clutch 1 is in a non-actuated state, pilot clutch 3 forms a friction lock as discs 6 and counter-discs 7 are clamped by means of lever element 10, such as a disc spring. When the internal combustion engine is started and clutch basket 5 thereby rotates, clutch hub 8 turns on ball bearing 13. If opposing torque is applied by clutch hub 14, for example, from an engaged gear or the slip torque of main clutch 4, ramp rings 11, 18 are rotated in relation to each other such that balls 22 roll on ramps 20, 21, that rise in the direction of traction, where ramp ring 18 axially abuts axially fixed ramp ring 11, and discs 16 and counter-discs 17 assume a friction lock from being clamped against output disc 19, and the main clutch therefore engages.

When the load changes to thrust mode, the rotation of ramp device 12 changes. With ramps 20, 21 in the direction of thrust that are also provided with slopes, torque builds in the direction of thrust after a zero passage. In order for the zero passage of ramps 20, 21 to coincide with the zero passage of the torque, the torque hysteresis that may exist from the friction and clamping torque of ramp device 12 and main clutch 4 with reference to the zero passage of ramps 20, 21 is compensated for by pre-tensioning ramp device 12 by means of energy storage mechanism 24 arranged in a circumferential direction between ramp ring 11 and clutch hub 14.

To open wet clutch 1, only the disengagement force for opening pilot clutch 3 needs to be applied. Lever element 10 is applied in the direction of arrow 25. This disengages the friction lock of the pilot clutch, thus, decreasing the axial pretension of ramp ring 11, and ramp ring 18 then releases the friction lock of the main clutch. Main clutch 4 is therefore actuated by supporting the rotation of wet clutch 1 by the internal combustion engine so that it can transmit strong torque when the disengagement paths are small and actuating force is low.

Figure 2:
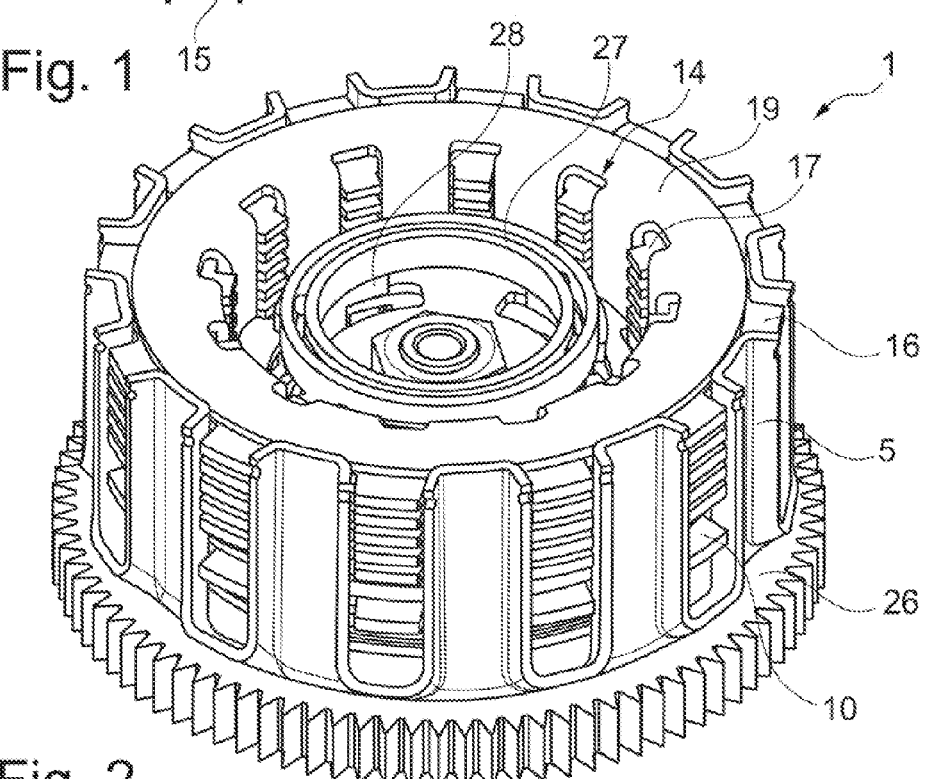
FIG. 2 is a perspective view of a structural model of the wet clutch of FIG. 1.

FIG. 2 is a perspective view of wet clutch 1 with clutch basket 5 on which starter ring gear 26 is seated. Discs 16 and counter-discs 17 are accommodated in layers between input disc 19 of clutch hub 14 and clutch basket 5. Lever element 10 is subject to axial force from clutch release bearing 27 and pressure piece 28.

Figure 3:
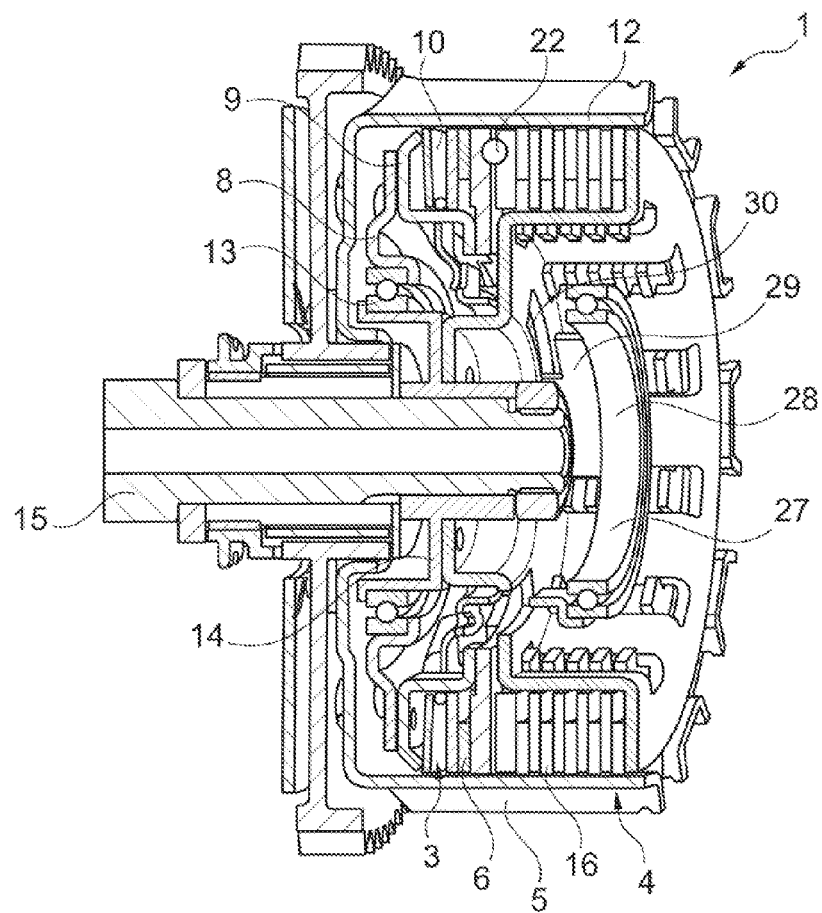
FIG. 3 shows a section of the wet clutch of FIG. 2.

FIG. 3 shows a section of wet clutch 1 depicted in FIG. 2. Clutch basket 5 is rotatably seated on transmission input shaft 15 and non-rotatably accommodates both discs 6 of pilot clutch 3 as well as discs 16 of main clutch 4. Clutch hub 14 is bolted non-rotatably to transmission input shaft 15 by means of a bolt, and accommodates clutch hub 8 with stop 9 for lever element 10 on ball bearing 13.

Ramp device 12 restricts the angle of rotation of both clutch hubs 8, 14 by the rolling angle of balls 22 on ramps 20, 21 (shown in FIG. 1) limited in a circumferential direction so that pressure piece 28 connected non-rotatably to lever element 10 penetrates corresponding cutout slots 30 in clutch hub 14 with extension arm 29 taking into account the angle of rotation between clutch hubs 8, 14, and accommodates clutch release bearing 27 by means of extension arm 29.

Figure 4:
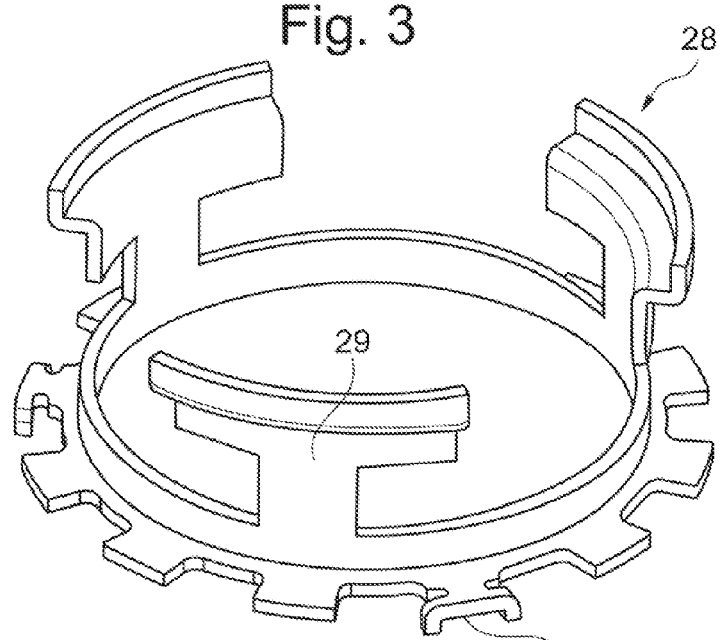
FIG. 4 is a perspective view of a pressure piece of the wet clutch depicted in FIG. 2.

FIG. 4 is a perspective view of pressure piece 28 from FIGS. 2 and 3, with extension arms 29 as well as claws 31 to be non-rotatably seated on lever element 10 (shown in FIG. 3).

Figure 5:
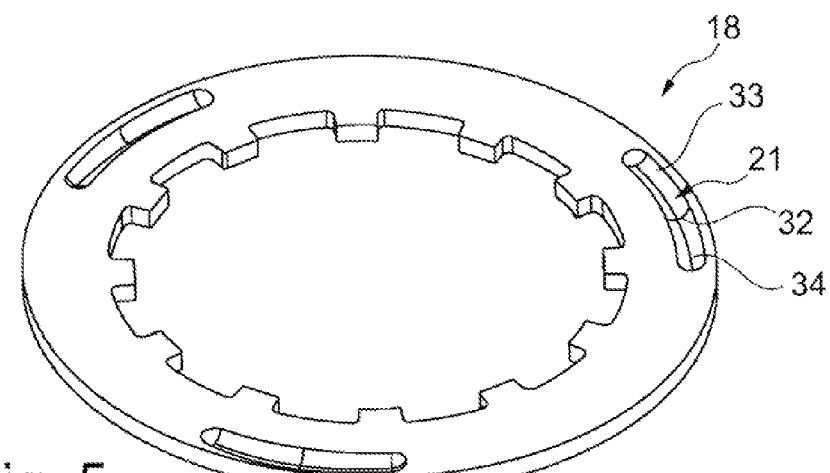
FIG. 5 is a perspective view of a ramp ring of the wet clutch illustrated in FIG. 2.

FIG. 5 is a perspective view of a structural embodiment of ramp ring 18. Three ramps 21 that are arranged evenly over the perimeter and in which the balls from FIG. 1 roll are incorporated in ramp ring 18 with slopes 33, 34 that rise from home position 32 in the circumferential direction.

With reference to FIG. 1, FIGS. 6, 6a, and 6b show the three operating states, respectively: "lift" when pilot clutch 3 is disengaged, "traction" in traction mode when torque flows from the internal combustion engine via the wet clutch to transmission input shaft 15, and "thrust" in thrust mode when torque transmitted via transmission input shaft 15 flows to clutch basket 5 to the downstream internal combustion engine of ramp device 12. When pilot clutch 3 is opened, ramp rings 11, 18 assume home position 32 of balls 22 set by ramps 20, 21 when ramp device 12 is in a state without force.

In "traction" mode, axial force $F_{ax}$ of engaged or engaging pilot clutch 3 and peripheral force $F_u$ acting on ramp ring 11 triggers the rotation of rotating ramp ring 11 with reference to still stationary ramp ring 18 by means of balls 22 and slopes 34, 35 that axially displace ramp ring 18, and main clutch 4 consequently engages.

In "thrust" mode, peripheral force $F_u$ reverses so that ramp rings 11, 18 rotate in relation to each other, and torque is again applied via main clutch 4 by slopes 33, 36 after a zero passage.

Figure 7:
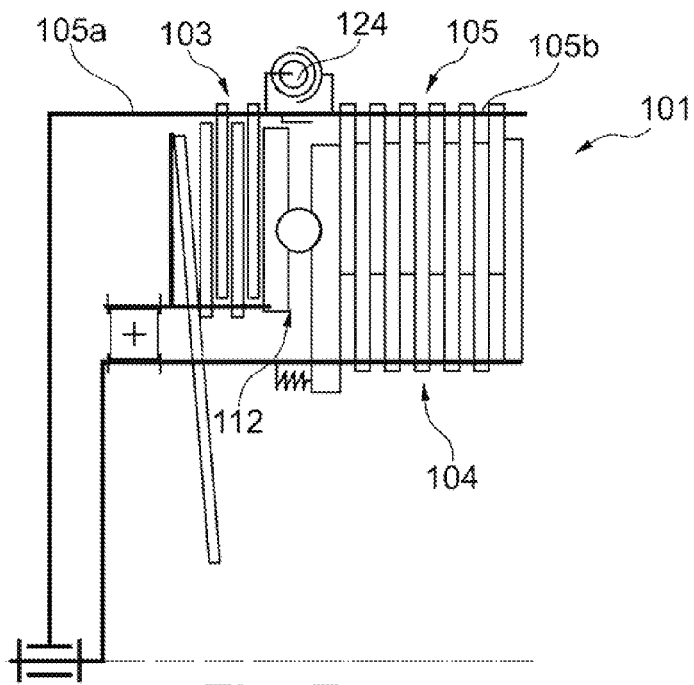
FIGS. 7 through 17 show schematic representations of partial sections of alternative embodiments of wet clutches.

FIG. 7 shows a schematically portrayed partial section of wet clutch 101. In contrast to wet clutch 1 in FIG. 1, clutch basket 105 is formed from two parts including clutch basket 105a of pilot clutch 103 and clutch basket 105b of main clutch 104. Energy storage mechanism 124 acting in the circumferential direction is provided between clutch baskets 105a, 105b to pre-tension ramp device 112 in the direction of traction.

Figure 8:
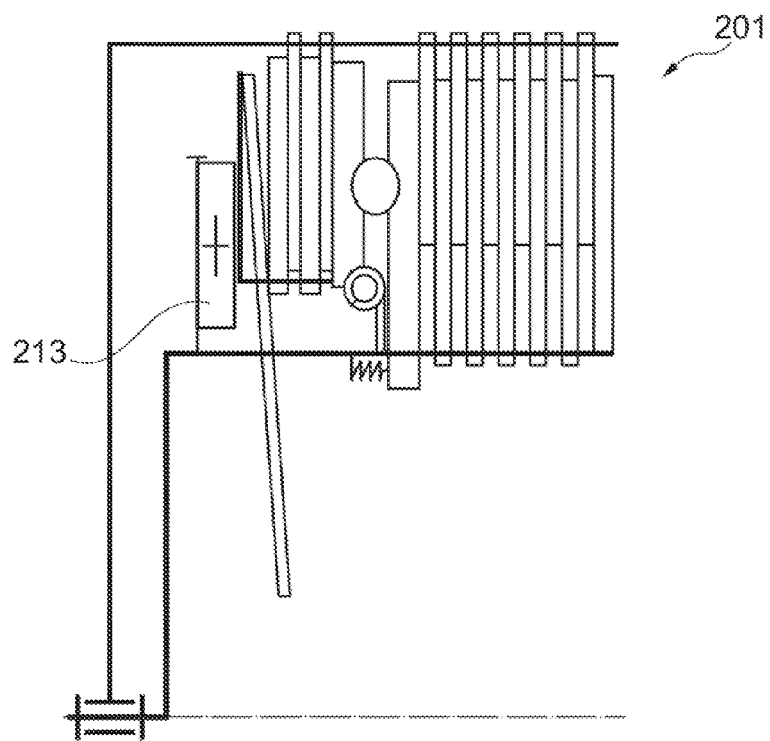
Figure 9:
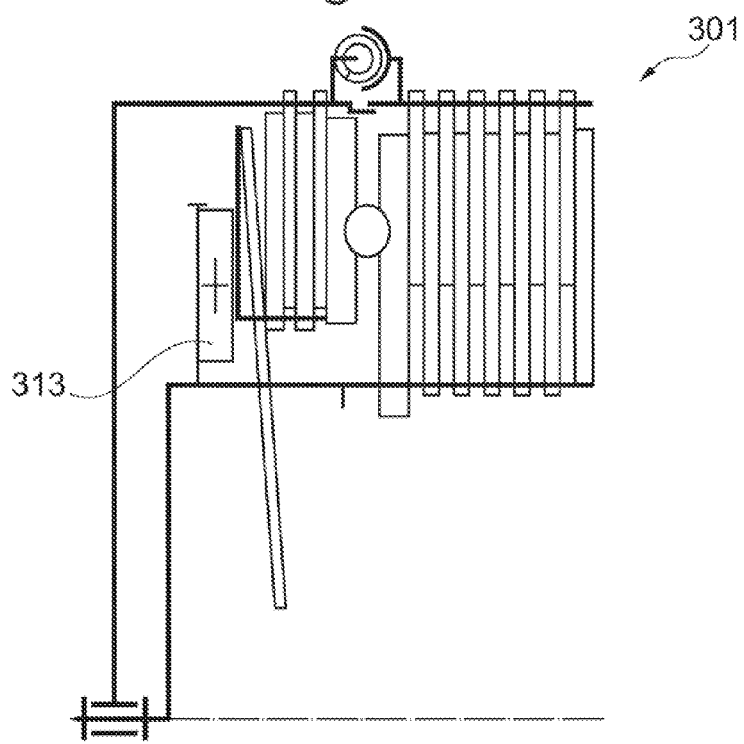

FIG. 8 shows a schematically portrayed partial section of wet clutch 201. In contrast to wet clutch 1, axial bearing 213 is provided instead of ball bearing 13. FIG. 9 shows the arrangement of wet clutch 101 from FIG. 7 that, as wet clutch 301 includes axial bearing 313 instead of the ball bearing.

Figure 10:
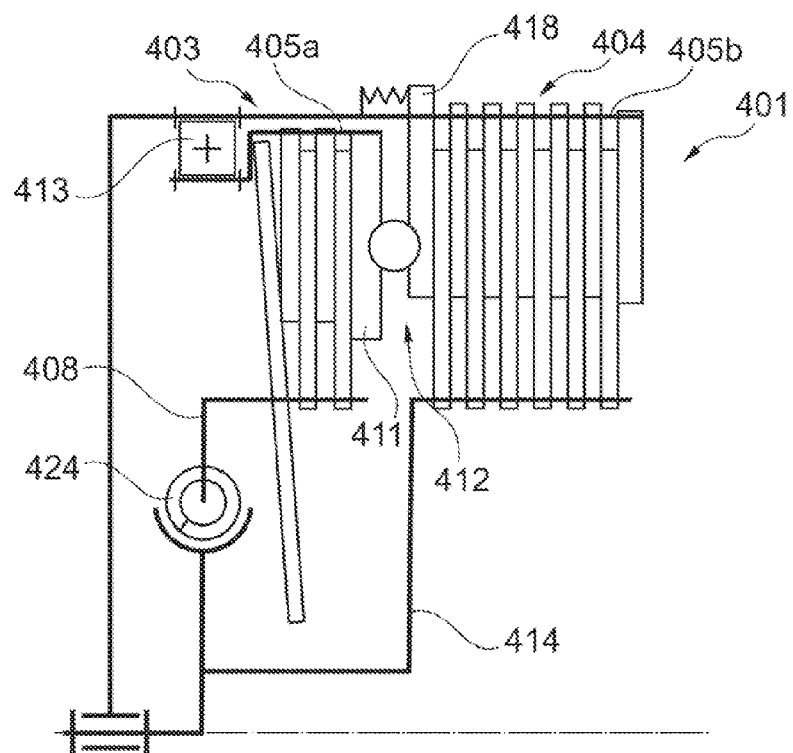

In another embodiment, FIG. 10 shows wet clutch 401 with ramp device 412 formed from two ramp rings 411, 418 suspended in separate clutch baskets 405a, 405b of pilot clutch 403 and main clutch 404. Ramp device 412 is pre-tensioned in the circumferential direction by means of energy storage mechanism 424 between clutch hub 408 of pilot clutch 403 and clutch hub 414 of main clutch 404. Clutch basket 405a is borne by means of ball bearing 413 on clutch basket 405b.

Figure 11:
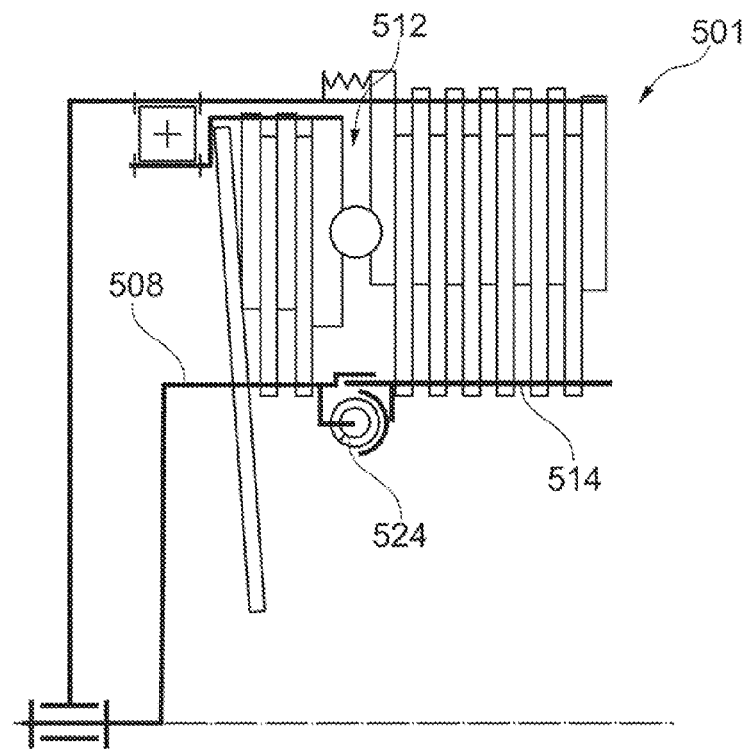

In contrast to wet clutch 401, FIG. 11 shows wet clutch 501 with sequential clutch hubs 508, 514 that are coupled to each other by means of energy storage mechanism 524, which acts in a circumferential direction to pre-tension ramp device 512.

Figure 12:
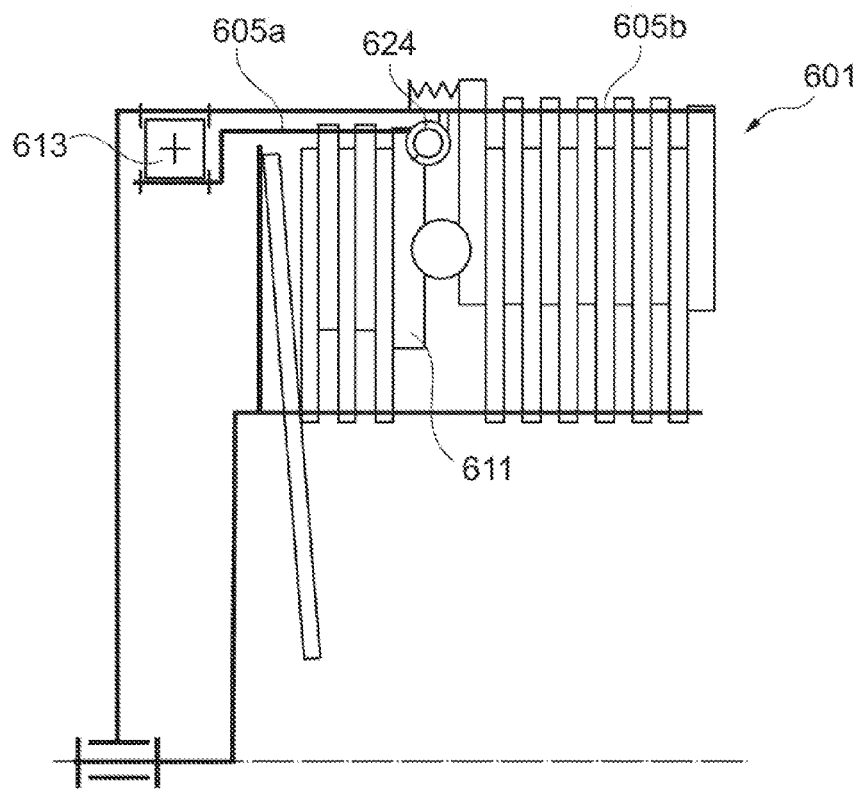
Figure 13:
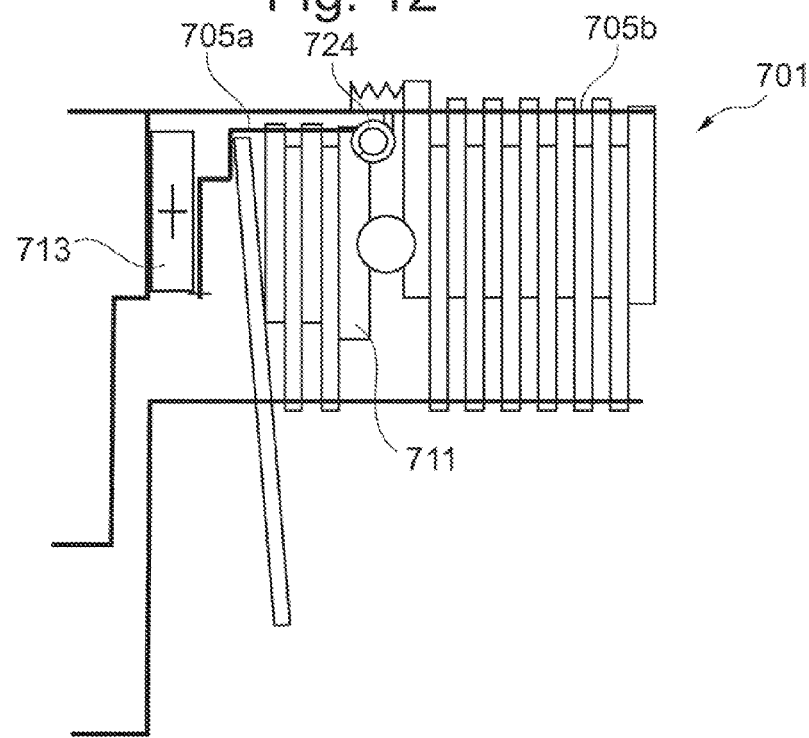

FIGS. 12 and 13 show partial sections of wet clutches 601, 701. In contrast to wet clutch 401 illustrated in FIG. 10, energy storage mechanism 624 or 724 is arranged between clutch basket 605b or 705b and ramp ring 611 or 711. Two wet clutches 601 and 701 differ in that there is ball bearing 613 or axial bearing 713 between clutch baskets 605a, 605b or 705a, 705b.

Figure 14:
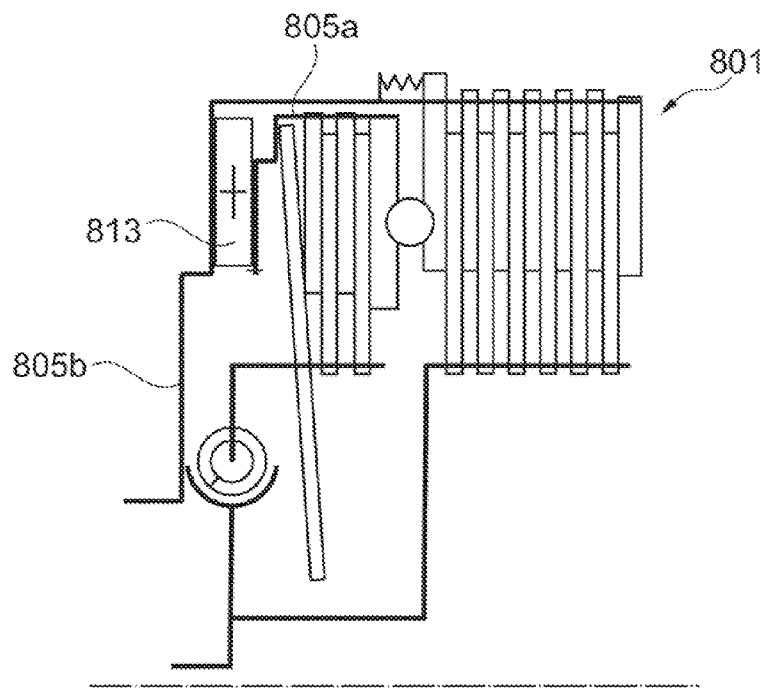

FIG. 14 shows wet clutch 801 similar to wet clutch 401 depicted in FIG. 10 with the difference that clutch basket 805a is borne axially against clutch basket 805b by means of axial bearing 813.

Figure 15:
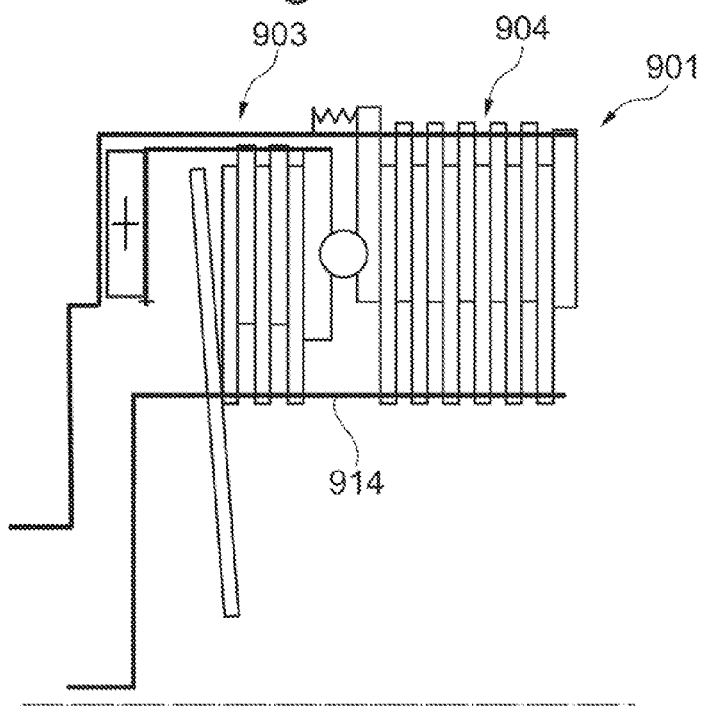

In contrast to wet clutch 801 shown in FIG. 14, wet clutch 901 illustrated in FIG. 15 with pilot clutch 903 and main clutch 904 is formed with single-part clutch hub 914.

Figure 16:
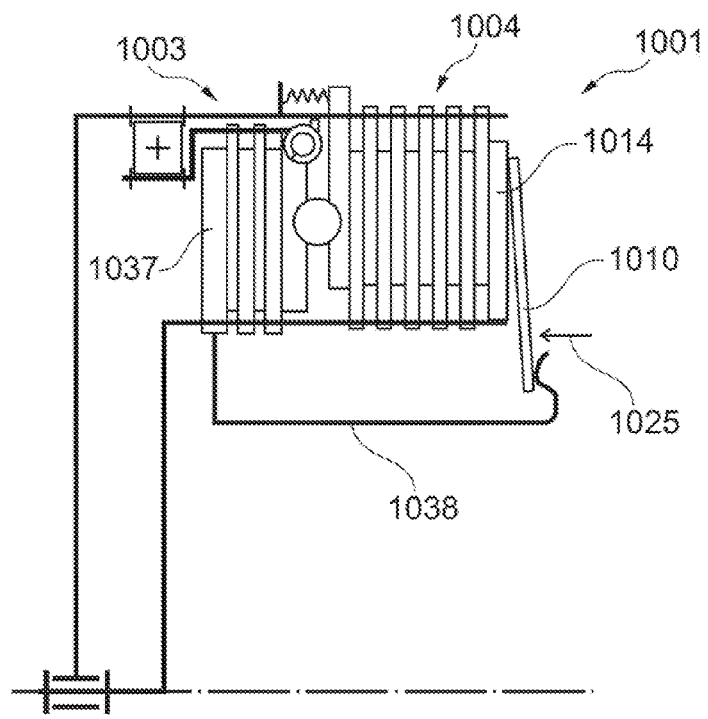

FIG. 16 shows a schematically portrayed partial section of wet clutch 1001. In contrast to wet clutch 401 shown in FIG. 10, clutch element 1010 is supported on output disc 1014 of main clutch 1004 on this side of wet clutch 1001 opposite pilot clutch 1003. The pretension of lever element 1010 is transmitted to input disc 1037 of pilot clutch 1003 by means of clasp 1038 that radially encompasses lever element 1010 on the inside. If the force is applied to lever element 1010 in the direction of arrow 1025, pilot clutch 1003 is disengaged.

Figure 17:
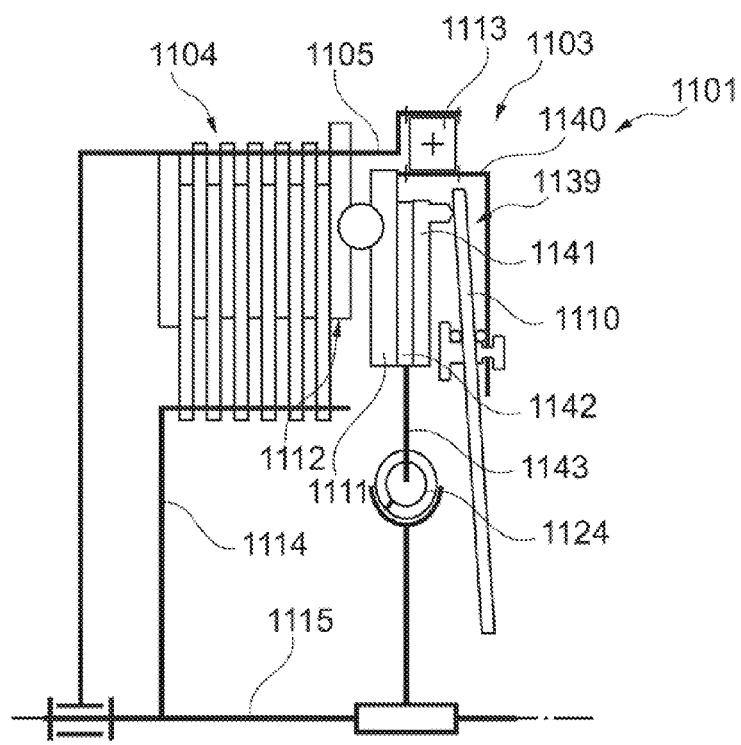

FIG. 17 shows wet clutch 1101 with main clutch 1104 designed as a wet clutch similar to that shown in FIGS. 1 through 16 with a pilot clutch 1103 contrastingly designed as dry friction clutch 1139. Input part 1140 with ramp ring 1111 is rotatably accommodated by means of ball bearing 1113 with clutch basket 1105 of main clutch 1104. Lever element 1110 is braced on input part 1140 and, by means of pressure plate 1141, clamps friction lining 1142 of clutch disc 1143 that is connected non-rotatably to transmission input shaft 1115 and hence to clutch hub 1114 of main clutch 1104. Energy storage mechanism 1124 acting in the circumferential direction and integrated in clutch disc 1143 pre-tensions ramp device 1112 in the direction of traction.

Figure 6:
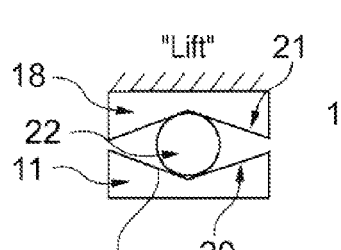
FIGS. 6, 6a, and 6b show different operating states of the ramp device of a wet clutch.
Figure 6A:
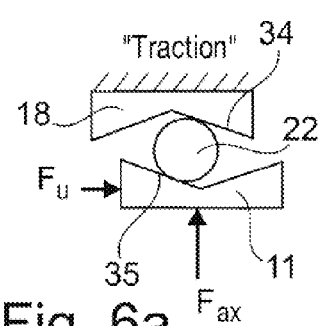
Figure 6B:
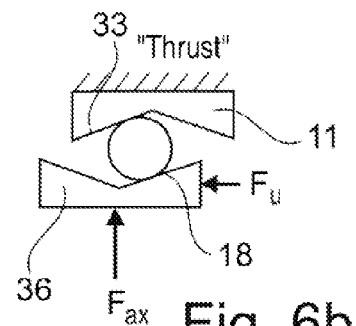

FIGS. 18a, 18b, and 18c show a section of ramp device 12a similar to that shown in FIGS. 6, 6a, and 6b in the "lift", "traction" and "thrust" modes that only has ramps 20, 21 for balls 22 with slopes 34a, 35a in ramp rings 11a, 18 in the direction of traction to prevent the rear wheel from hopping. Proceeding from home position 32 when the pilot clutch is disengaged in "lift" mode and in "traction" mode when the clutch is engaged, ramp rings 11a, 18a rotate along slopes 34a, 35a and hence axially displace ramp ring 18a, which clamps the main clutch with an increasing friction lock. In "thrust" mode, there is no axial displacement of ramp ring 18a since there are no slopes.

The main clutch is therefore not engaged. Torque is only transmitted via the pilot clutch so that the internal combustion engine is gradually accelerated, preferably with the maximum torque transmissible via the pilot clutch. If thrust torque arises, the pilot clutch slips. To limit the angle of rotation of two ramp rings 11a, 18a in the direction of thrust, ball bearing 13 of correspondingly adapted wet clutch from FIG. 1 is designed as a freewheel, such as a ratchet freewheel or loop spring freewheel, that is engaged in the direction of traction and locked in the direction of thrust. If the wet clutch experiences force in the direction of thrust, the freewheel is locked, and the pilot clutch is connected to the clutch hub and clutch basket of the main clutch. In this manner, the torque in the main clutch is initially decreased when ramp rings 11a, 18a rotate in "thrust" mode, and the further rotation of the ramp device is stopped depending on the activation time of the freewheel.

In another embodiment of ramp device 12a from FIGS. 18a, 18b, and 18c, the sections of the ramp devices 12b, 12c provided in FIGS. 19, 19a, and 19b and 20, 20a, and 20b shown in "lift", "traction", and "thrust" modes do not have a freewheel and can be designed corresponding to the previously shown embodiments. In ramp devices 12b, 12c, the rotation of ramp rings 11b, 18b and 11c, 18c in "thrust" mode is limited the respective stops 44, 45 and 44a, 45a. Stops 44, 44a, 45, 45a for balls 22 cause the thrust torque to be transmitted to the pilot clutch when balls 22 contact, and the pilot clutch transmits the applied thrust torque to the internal combustion engine up to the maximum transmissible torque level.

Figure 21:
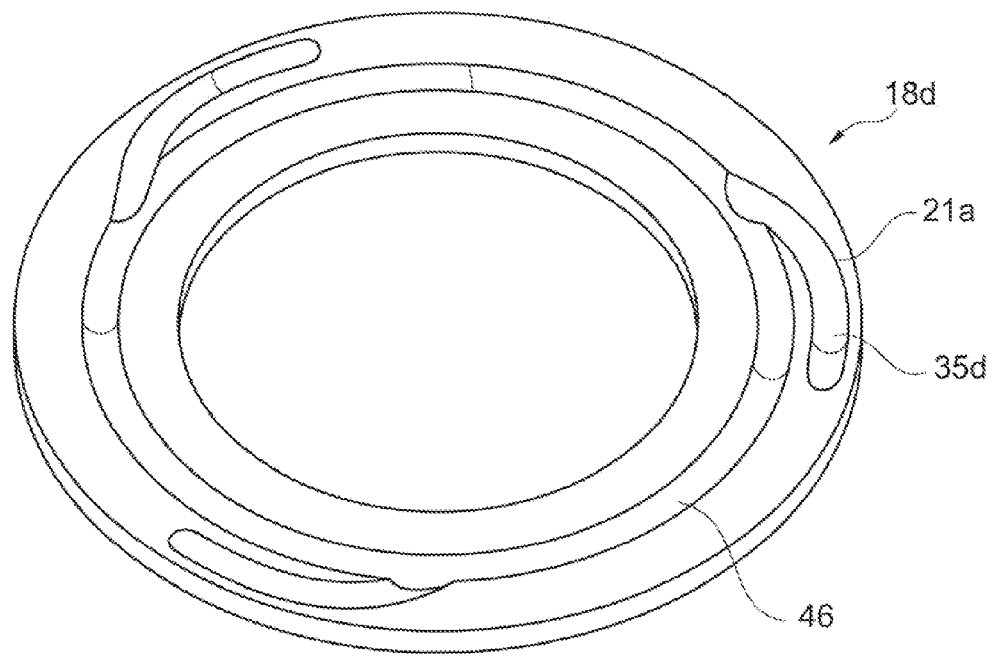
FIG. 21 is a perspective view of a ramp ring with ramps arranged radially outside of an annular groove; and, FIG. 22 is a perspective view of a friction ring having spring-actuated leading ramps for the balls.

FIG. 21 schematically portrays ramp ring 18d that can be used in a pair in a ramp device that, for example, is modified from ramp device 12 in FIG. 1, where the keyed transmission (not shown in FIG. 21) is adapted to the respective position of ramp ring 18d. Ramp ring 18d has continuous annular groove 46 on which the balls roll when two ramp rings 18d lay on each other. In traction mode, the balls that are radially displaceable in a corresponding ball cage and are fixed in a peripheral position in relation to each other are displaced under centrifugal force radially to the outside by means of ramps 21a provided with slopes 35b in a circumferential direction, whereby two ramp rings 18d are axially displaced in traction mode, and the main clutch is engaged. In thrust mode, the balls drop back on annular groove 46 and roll down it. Torque does not act between the main clutch and pilot clutch, and the internal combustion engine is hence completely disengaged from the transmission and therefore from the rear wheel in thrust mode.

Figure 22:
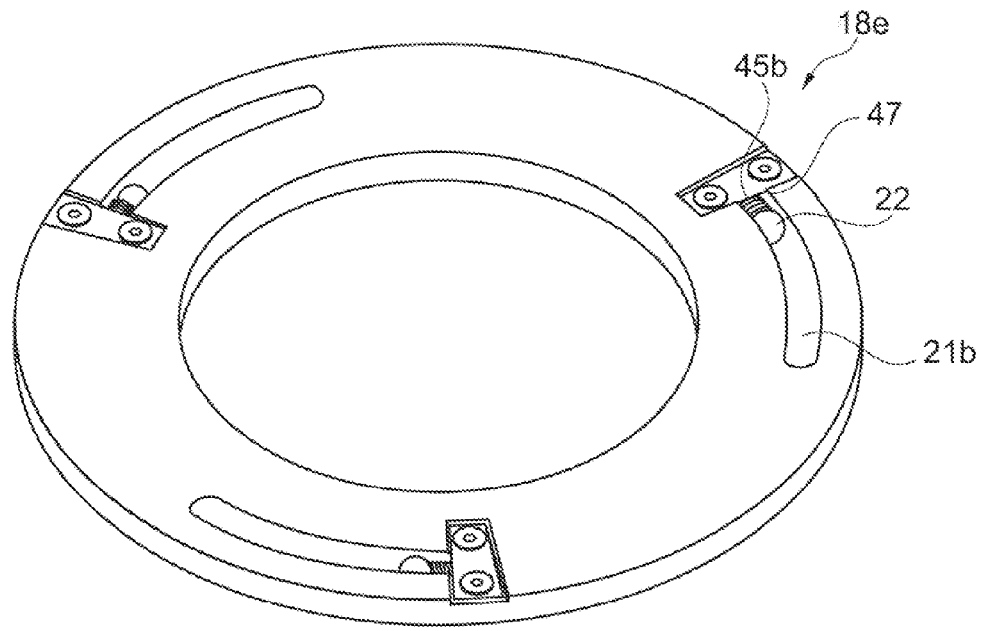

FIG. 22 shows ramp ring 18e that, together with a ring part provided within annular groove on the diameter of ramps 21b arranged in a circumferential direction and provided with a slope, forms the corresponding ramp device with intermediately inserted balls 22. Ramp ring 18e and the ring part are axially spaced in relation to each other so that, in traction mode, the ramp ring executes an axial stroke along the slopes of ramps 21b to actuate the main clutch in traction mode and, in thrust mode, balls 22 are moved against stop 45b dampened by means of helical spring 47 securely accommodated in ramp ring 18e and glide on the annular groove of the ring part so that ramp ring 18e can be rotated with reference to the ring part with only slight friction, and the associated wet clutch disengages the internal combustion engine substantially non-rotatably from the transmission in thrust mode.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of Reference Numbers

| 1 | Wet clutch |
|---|---|
| 2 | Rotational axis |
| 3 | Pilot clutch |
| 4 | Main clutch |

-continued

| | |
|---|---|
| 5 | Clutch basket |
| 6 | Disc |
| 7 | Counter-disc |
| 8 | Clutch hub |
| 9 | Stop |
| 10 | Lever element |
| 11 | Ramp ring |
| 11a | Ramp ring |
| 11b | Ramp ring |
| 11c | Ramp ring |
| 12 | Ramp device |
| 12a | Ramp device |
| 12b | Ramp device |
| 12c | Ramp device |
| 13 | Ball bearing |
| 14 | Clutch hub |
| 15 | Transmission input shaft |
| 16 | Disc |
| 17 | Counter-disc |
| 18 | Ramp ring |
| 18a | Ramp ring |
| 18b | Ramp ring |
| 18c | Ramp ring |
| 18d | Ramp ring |
| 18e | Ramp ring |
| 19 | Output disc |
| 20 | Ramp |
| 21 | Ramp |
| 21a | Ramp |
| 21b | Ramp |
| 22 | Ball |
| 23 | Tension spring |
| 24 | Energy storage mechanism |
| 25 | Arrow |
| 26 | Starter ring gear |
| 27 | Clutch release bearing |
| 28 | Pressure piece |
| 29 | Extension arm |
| 30 | Slot |
| 31 | Claw |
| 32 | Home position |
| 33 | Slope |
| 34 | Slope |
| 34a | Slope |
| 35 | Slope |
| 35a | Slope |
| 35b | Slope |
| 36 | Slope |
| 44 | Stop |
| 44a | Stop |
| 45 | Stop |
| 45a | Stop |
| 45b | Stop |
| 46 | Annular groove |
| 47 | Helical spring |
| 101 | Wet clutch |
| 103 | Pilot clutch |
| 104 | Main clutch |
| 105 | Clutch basket |
| 105a | Clutch basket |
| 105b | Clutch basket |
| 112 | Ramp device |
| 124 | Energy storage mechanism |
| 201 | Wet clutch |
| 213 | Axial bearing |
| 301 | Wet clutch |
| 313 | Axial bearing |
| 401 | Wet clutch |
| 403 | Pilot clutch |
| 404 | Main clutch |
| 405a | Clutch basket |
| 405b | Clutch basket |
| 408 | Clutch hub |
| 411 | Ramp ring |
| 412 | Ramp device |
| 413 | Ball bearing |
| 414 | Clutch hub |
| 418 | Ramp ring |
| 424 | Energy storage mechanism |
| 501 | Wet clutch |
| 508 | Clutch hub |
| 512 | Ramp device |
| 514 | Clutch hub |
| 524 | Energy storage mechanism |
| 601 | Wet clutch |
| 605a | Clutch basket |
| 605b | Clutch basket |
| 611 | Ramp ring |
| 613 | Ball bearing |
| 624 | Energy storage mechanism |
| 701 | Wet clutch |
| 705a | Clutch basket |
| 705b | Clutch basket |
| 711 | Ramp ring |
| 713 | Axial bearing |
| 724 | Energy storage mechanism |
| 801 | Wet clutch |
| 805a | Clutch basket |
| 805b | Clutch basket |
| 813 | Axial bearing |
| 901 | Wet clutch |
| 903 | Pilot clutch |
| 904 | Main clutch |
| 914 | Clutch hub |
| 1001 | Wet clutch |
| 1003 | Pilot clutch |
| 1004 | Main clutch |
| 1010 | Lever element |
| 1019 | Output disc |
| 1025 | Arrow |
| 1037 | Input disc |
| 1038 | Clasp |
| 1101 | Wet clutch |
| 1103 | Pilot clutch |
| 1104 | Main clutch |
| 1105 | Clutch basket |
| 1110 | Lever element |
| 1111 | Ramp ring |
| 1112 | Ramp device |
| 1113 | Ball bearing |
| 1114 | Clutch hub |
| 1115 | Transmission input shaft |
| 1124 | Energy storage mechanism |
| 1139 | Friction clutch |
| 1140 | Input part |
| 1141 | Pressure plate |
| 1142 | Friction lining |
| 1143 | Clutch disc |
| $F_{ax}$ | Axial force |
| $F_u$ | Circumferential force |

What is claimed is:

1. A wet clutch comprising:

a main clutch;

a clutch basket, which is actively connected to a crankshaft, forming an intake part and having a plurality of discs mounted therein so as to be rotatably fixed to the clutch basket and axially displaceable with respect to the clutch basket;

a first clutch hub which is connected to a transmission input shaft, forming an output part and having counter-discs that are layered in an alternating manner with the plurality of discs, wherein the counter-discs are mounted so as to be rotatably fixed to the first clutch hub and axially displaceable with respect to the first clutch hub;

a pilot clutch, actuated by means of a lever element and including a second clutch hub; and, a ramp device including:

a first ramp ring rotatably fixed to the first clutch hub;

a second ramp ring rotatably fixed to the second clutch hub; and, at least one ball disposed between the first and second ramps, in contact with the first and second ramps, and aligned with the plurality of discs in a direction parallel to a rotary axis for the wet clutch, wherein:
the pilot clutch is upstream from the main clutch;
the pilot clutch and the main clutch are connected to each other by means of the ramp device;
the ramp device includes, in the circumferential direction, a plurality of ramps that are active at least in a direction of traction of an internal combustion engine; and,
the wet clutch is arranged between a crankshaft of the internal combustion engine and the transmission input shaft of a transmission in a drivetrain.

2. The wet clutch as recited in claim 1, wherein the pilot clutch is rotatably arranged on the first clutch hub and acts in a direction of rotation with the clutch basket.

3. The wet clutch as recited in claim 2, wherein the pilot clutch is designed as a wet clutch having a separate clutch basket that is connected to the clutch basket of the main clutch by means of an energy storage mechanism that acts in the circumferential direction of the main clutch.

4. The wet clutch as recited in claim 1, wherein the pilot clutch is rotatably arranged on the clutch basket and acts in a direction of rotation with the first clutch hub.

5. The wet clutch as recited in claim 4, wherein the pilot clutch is designed as a wet clutch and the second clutch hub is connected to the first clutch hub of the main clutch by means of an energy storage mechanism that acts in the circumferential direction.

6. The wet clutch as recited in claim 1, wherein the lever element is axially clamped between:
an input disc of the pilot clutch and an output disc of the main clutch; or
an output disc of the main clutch and a component non-rotatably connected to an input disc of the pilot clutch.

7. The wet clutch as recited in claim 1, wherein the ramp device comprises a plurality of ramp rings that can be limitedly rotated relative to each other in at least one circumferential direction with the plurality of ramps having a complementary slope relative to each other in which a ball rolls.

8. The wet clutch as recited in claim 7, wherein the first and second ramp rings rotate in a thrust direction without sloping ramps.

9. The wet clutch as recited in claim 1, wherein the main clutch and the pilot clutch are disengaged during a transition to thrust mode from traction mode and during a transition from thrust mode to traction mode.

10. A wet clutch comprising:
a main clutch;
a clutch basket, which is actively connected to a crankshaft, forming an intake part and having a plurality of discs mounted therein so as to be rotatably fixed to the clutch basket and axially displaceable with respect to the clutch basket;
a first clutch hub which is connected to a transmission input shaft, forming an output part and having counter-discs that are layered in an alternating manner with the plurality of discs, wherein the counter-discs are mounted so as to be rotatably fixed to the first clutch hub and axially displaceable with respect to the first clutch hub; and,
a pilot clutch, actuated by means of a lever element, wherein:
the lever element is axially clamped between:
an input disc of the pilot clutch and an output disc of the main clutch; or
an output disc of the main clutch and a component non-rotatably connected to an input disc of the pilot clutch;
the pilot clutch is upstream from the main clutch;
the pilot clutch and the main clutch are connected to each other by means of the ramp device;
the ramp device includes, in the circumferential direction, a plurality of ramps that are active at least in a direction of traction of an internal combustion engine; and,
the wet clutch is arranged between a crankshaft of the internal combustion engine and the transmission intake shaft of a transmission in a drivetrain.

11. A wet clutch comprising:
a main clutch;
a clutch basket, which is actively connected to a crankshaft, forming an intake part and having a plurality of discs mounted therein so as to be rotatably fixed to the clutch basket and axially displaceable with respect to the clutch basket;
a first clutch hub which is connected to a transmission input shaft, forming an output part and having counter-discs that are layered in an alternating manner with the plurality of discs, wherein the counter-discs are mounted so as to be rotatably fixed to the first clutch hub and axially displaceable with respect to the first clutch hub; and,
a pilot clutch, actuated by means of a lever element, wherein:
the pilot clutch is upstream from the main clutch;
the pilot clutch and the main clutch are connected to each other by means of the ramp device;
the ramp device includes, in the circumferential direction, a plurality of ramps that are active at least in a direction of traction of an internal combustion engine;
the wet clutch is arranged between a crankshaft of the internal combustion engine and the transmission intake shaft of a transmission in a drivetrain;
the pilot clutch is rotatably arranged on the first clutch hub and acts in a direction of rotation with the clutch basket; and,
the pilot clutch is designed as a wet clutch having a separate clutch basket that is connected to the clutch basket of the main clutch by means of an energy storage mechanism that acts in the circumferential direction of the main clutch.

* * * * *